March 31, 1925.  1,531,602

H. S. FOLKER

AIR STRAINER

Filed March 25, 1924

INVENTOR
HOWARD S. FOLKER.
BY
ATTORNEY

Patented Mar. 31, 1925.

1,531,602

UNITED STATES PATENT OFFICE.

HOWARD S. FOLKER, OF MILL VALLEY, CALIFORNIA, ASSIGNOR TO THE NATIONAL SAFETY APPLIANCE COMPANY, OF SAN FRANCISCO, CALIFORNIA, A CORPORATION OF CALIFORNIA.

AIR STRAINER.

Application filed March 25, 1924. Serial No. 701,678.

*To all whom it may concern:*

Be it known that I, HOWARD S. FOLKER, a citizen of the United States, and a resident of Mill Valley, county of Marin, State of California, have invented certain new and useful Improvements in Air Strainers, of which the following is a specification.

My present invention relates to air strainers adapted to remove dirt and moisture from air in circulation.

More particularly the invention has for its object to provide an air strainer adapted to efficiently clean compressed air supplied irregularly, or at intervals, or not at a constant rate.

Another object of the invention is to provide a strainer that may be readily taken apart for cleaning or replacement of parts without disturbing its support or disconnecting its pipe connections.

Other objects of the invention are to provide a chamber in the strainer in which the air is cooled and the moisture therein condensed and collected, and from which this collected moisture and other dirt or sediment may be withdrawn or removed, and to provide a straining or filtering mass for the air, protected against the carrying of condensed moisture thereinto.

With these and other objects in view, the invention comprises the device described and set forth in the following specification and claims.

Figure 1:
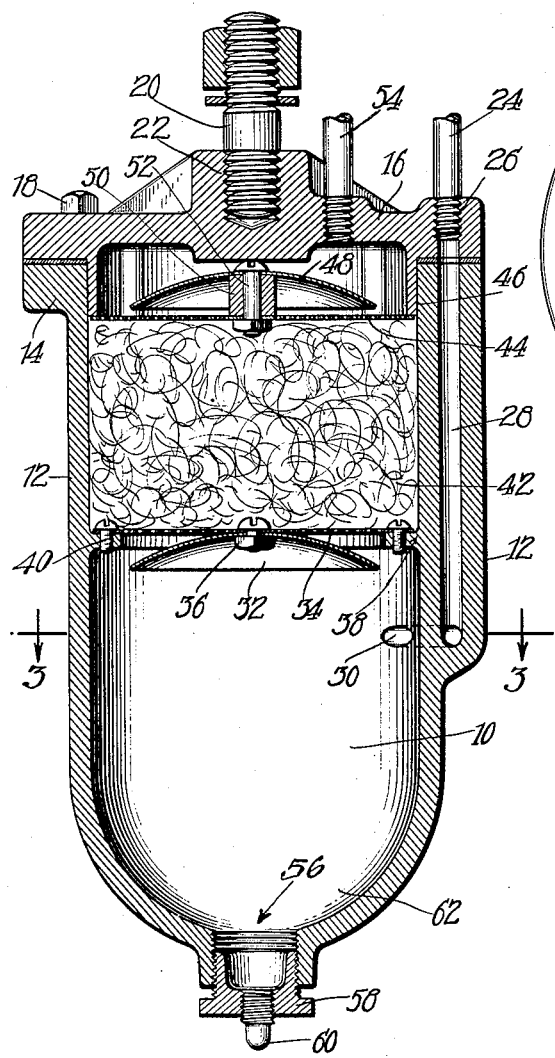
Figure 2:
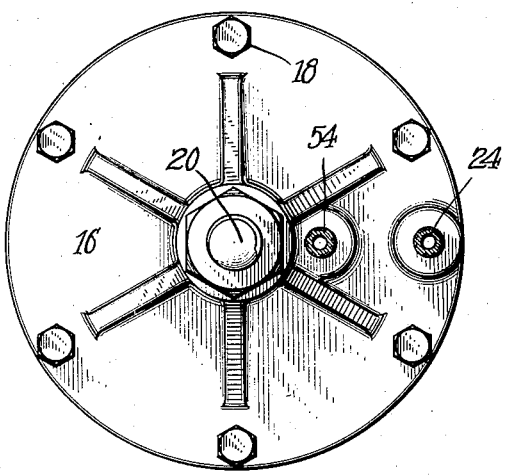
Figure 3:
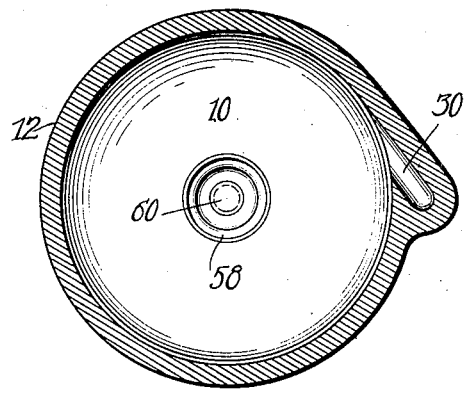

The various features of the invention are illustrated in the accompanying drawings in which, Fig. 1 is a vertical sectional view of an air strainer embodying a preferred form of the invention, Fig. 2 is a plan view of the air strainer shown in Fig. 1, and, Fig. 3 is a cross sectional view of the strainer taken on line 3—3 of Fig. 1.

In my present invention, the air to be strained is conducted into a chamber having cylindrical walls and directed tangentially against the inner surface of the cylindrical walls. In this chamber the air is allowed to expand and cool somewhat, thereby condensing some of the moisture, which is thrown against the cylindrical walls by the circular or swirling movement imparted to the air as it enters the chamber. When the entrance of the air is not continuous but intermittent, and the circular movement is accordingly intermittently interrupted, it can not be depended on to completely and perfectly free the air of moisture. The air is therefore led about baffles, which also serve to free the air of moisture and dirt and assist its even distribution, and is then passed in a slowly moving stream through a fibrous filtering medium in which any remaining suspended particles or drops are removed. The straining chamber is supported from its cover, through which, also, the pipe connections are made so that when disconnected from the cover, it may be removed without disturbing the pipes and may be readily inspected and cleaned.

Referring more particularly to the accompanying drawings, the straining elements are contained within a chamber, or strainer body, 10 having cylindrical walls 12 and having an outwardly projecting flange 14 at its upper edge through which it is attached to a cover 16 by means of suitable bolts 18. The chamber 10 is supported from the cover 16 and the cover in turn supported by means of a supporting stud 20 threaded into a central boss 22 on the upper surface of the cover.

The air to be strained or freed of its moisture and entrained dust or dirt is admitted from a supply pipe 24 threaded in an inlet opening 26 in the cover 16 and then passes through a passage 28, extending vertically or longitudinally in the cylindrical wall 12, with which the inlet 26 communicates. The passage 28 turns horizontally at its lower end and enters the chamber 10 through an outlet 30 entering the chamber in a tangential direction to the cylindrical walls 12. The air is thereby directed against the cylindrical walls and thus given a rotary or swirling motion which tends to throw out particles of dust or other particles through centrifugal action. Some expansion of the air is also permitted in the chamber 10 which tends to cool the air and condense additional moisture, which is also thrown against the cylindrical walls and thus removed from the air.

When the air is admitted to the apparatus intermittently, the centrifugal action of the entering air is much less effective than would be the case if it were admitted continuously. To remove any particles that may not have been removed through this action, the air is caused to pass upwardly about a downwardly curved baffle 32, disposed centrally about the level of the inlet 30. The baffle 32 is supported on the lower face of a foraminous plate 34 by means of a screw 36 or equivalent means, and is, in turn, supported on a ledge 38 projecting inwardly from the inner surface of the cylindrical wall 12. The plate 34 may be rigidly held on the ledge 38 by means of screws 40 and the baffle 32 thus positively held in its proper position.

After passing about the baffle 32, the air passes through foraminous plate 34 and through a mass of fibrous filtering material 42 resting on the upper surface of the plate. This filtering mass may be of any suitable material, curled hair being preferred. In passing through this filtering mass, particles that may not have been removed through the centrifugal action of the circling gases in the chamber 10 are removed, the slowness of movement in this portion of the apparatus and the large surface for entrainment of particles afforded by the curled hair facilitating this action.

The top of the filtering mass is covered by means of a foraminous plate 44, which is held in place by means of an annular flange 46 depending from the cover 16 and fitting closely against the inner surface of the cylindrical wall 12. After passing through the plate 44, the air is deflected by means of a downwardly curved baffle 48 supported centrally a short distance above the plate by means of a spacing collar 50 and bolt 52. After passing about the baffle 48 the purified air is received under the cover 16 and passes out of the apparatus through an outlet pipe 54.

With this arrangement, the chamber 10 is supported entirely from the cover 16 and is entirely free of all pipe connections so that, after being detached from the cover, it may be freely removed. When so removed, the plates and filtering material may be easily removed and replaced.

The moisture, oil, or other sediment collected in the lower part of the chamber 10 may be removed through an opening 56, closed by means of a bushing 58 and plug 60. To assist in the collection of this sediment about the plug 60 and its easy removal from the chamber, the chamber is formed with a rounded or semispherical bottom 62. It will be understood that, in place of the plug 60 a pet cock or other equivalent means may be employed.

While the device is particularly adapted for use with intermittent or pulsating currents of air, it may be used to advantage with steady currents if desired.

Having described the invention, what I claim and desire to secure by Letters Patent is:

1. A device of the type described which comprises, a chamber having cylindrical walls, a passage in said walls and entering said chamber tangentially, a filtering mass of fibrous material in said chamber above the entrance of said passage thereinto, a baffle positioned centrally immediately below said filtering mass, a baffle mounted centrally above said filtering mass, and an outlet above said baffle.

2. A device of the type described which comprises, a chamber having cylindrical walls and a rounded bottom, a removable plug in said bottom, a passage in said walls and entering said chamber tangentially, a filtering mass of fibrous material in said chamber above the entrance of said passage thereinto, a baffle positioned centrally immediately below said filtering mass, a baffle mounted centrally above said filtering mass, and an outlet above said baffle.

3. A device of the type described which comprises, a chamber having cylindrical walls, a passage in said walls and entering said chamber tangentially, a filtering mass of fibrous material in said chamber above the entrance of said passage thereinto, a downwardly curved baffle positioned centrally below said filtering mass and above said entrance, a downwardly curved baffle mounted centrally above said filtering mass, and an outlet above said upper baffle.

4. A device of the type described which comprises, a chamber having cylindrical walls and a ledge projecting inwardly from said walls, a passage in said walls and entering said chamber tangentially below said ledge, a foraminous plate supported on said ledge and extending across said chamber, a cover for said chamber having a downwardly depending annular flange fitting against the inner surface of said cylindrical walls, a foraminous plate positioned under said flange to extend across said chamber above said ledge, and a mass of fibrous filtering material supported between said plates.

5. A device of the type described which comprises, a chamber having cylindrical walls and a ledge projecting inwardly from said walls, a passage in said walls and entering said chamber tangentially below said ledge, a foraminous plate supported on said ledge and extending across said chamber, a cover for said chamber having a downwardly depending annular flange fitting against the inner surface of said cylindrical walls, a foraminus plate mounted under said flange to extend across said chamber above said ledge, a mass of fibrous filtering material supported between said plates, a downwardly curved baffle mounted centrally below said lower plate and above said entrance.

6. A device of the type described which comprises, a chamber having cylindrical walls, a ledge projecting inwardly from said walls, a passage in said walls entering said chamber below said ledge, a foraminous plate supported on said ledge and extending across said chamber, a cover for said chamber having a downwardly depending annular flange fitting against the inner surface of said cylindrical walls, a foraminous plate mounted under said flange to extend across said chamber above said ledge, a mass of fibrous filtering material supported between said plates, a downwardly curved baffle mounted centrally below said lower plate and above said entrance and a downwardly curved baffle mounted centrally above said upper plate.

7. A device of the type described which comprises, a cover, means for supporting said cover, a chamber closed by and depending from said cover, a mass of fibrous filtering material extending horizontally across said chamber, an outlet port in said cover opening above said mass of fibrous material, an inlet port in said cover, a passage in said chamber communicating with said inlet port and entering said chamber tangentially below said filtering mass, a downwardly curved baffle positioned centrally below said filtering mass, a downwardly curved baffle positioned centrally above said filtering mass, and means for venting said chamber below said entrance of said chamber thereinto.

8. A device of the type described which comprises, a cover having a depending annular flange, a foraminous plate supported at its outer edge under the lower edge of said flange, a downwardly curved baffle mounted centrally on and spaced slightly above said plate, a chamber having cylindrical walls fitting about said annular flange, means for supporting said chamber from said cover, an inwardly projecting ledge in said cylindrical wall, a foraminous plate supported on said ledge and spanning said chamber, a downwardly curved baffle mounted centrally on the lower face of said plate, a mass of fibrous filtering material mounted between said plates, and a vent in the lower part of said chamber, said cover having an outlet opening and an inlet opening and said cylindrical walls having a passage leading from said inlet opening and entering said chamber below said lower foraminous plate in a tangential direction to said cylindrical walls.

HOWARD S. FOLKER.